United States Patent
Mitchell et al.

(10) Patent No.: US 9,843,943 B1
(45) Date of Patent: Dec. 12, 2017

(54) APPLICATION-LEVEL QUALITY OF SERVICE TESTING SYSTEM

(71) Applicant: T-Mobile USA, Inc., Bellevue, WA (US)

(72) Inventors: Michael J. Mitchell, Bellevue, WA (US); Peter P. Myron, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/265,713

(22) Filed: Sep. 14, 2016

(51) Int. Cl.
*H04W 24/02* (2009.01)
*H04W 4/14* (2009.01)
*H04W 72/04* (2009.01)
*H04L 12/26* (2006.01)

(52) U.S. Cl.
CPC ........... *H04W 24/02* (2013.01); *H04L 43/106* (2013.01); *H04W 4/14* (2013.01); *H04W 72/0493* (2013.01)

(58) Field of Classification Search
CPC ......... H04W 4/02; H04W 4/025; H04W 4/04; H04W 4/206; H04W 4/06; H04W 4/00; H04W 4/12; H04W 4/14; H04W 88/023
See application file for complete search history.

(56) References Cited

U.S. PATENT DOCUMENTS

| | | | | |
|---|---|---|---|---|
| 5,539,884 A | * | 7/1996 | Robrock, II | H04L 49/3081 370/399 |
| 7,076,541 B1 | * | 7/2006 | Burstein | H04L 29/12066 707/999.003 |
| 8,200,262 B2 | * | 6/2012 | McGary | H04L 51/18 455/466 |
| 9,547,584 B2 | * | 1/2017 | Acharya | G06F 11/3688 |
| 2009/0150536 A1 | * | 6/2009 | Wolman | H04L 67/1012 709/224 |
| 2009/0252087 A1 | * | 10/2009 | Jiang | H04W 4/02 370/328 |
| 2012/0284696 A1 | * | 11/2012 | Koskinen | G06F 8/447 717/126 |
| 2014/0019520 A1 | * | 1/2014 | Milburn | H04N 5/04 709/203 |
| 2014/0149285 A1 | * | 5/2014 | De | G06Q 20/3276 705/41 |

* cited by examiner

*Primary Examiner* — Jean Gelin
(74) *Attorney, Agent, or Firm* — Lee & Hayes, PLLC

(57) ABSTRACT

Described herein are systems and methods for testing the application quality of service in addition to the network quality of service to electronic devices, for example where the electronic devices are located within a massive user presence environment. The systems and methods further comprise improving the quality of service to the electronic devices by making changes to the telecommunication network on a predictive basis based upon future events that result in a massive user presence. The techniques described herein improve the functioning of the network and improve the functioning of applications running on electronic devices.

19 Claims, 7 Drawing Sheets

APPLICATION-LEVEL QUALITY OF SERVICE TESTING SYSTEM

BACKGROUND

As electronic devices have become more prolific, people rely on them to share and retrieve information. However, problems exist when people congregate in large numbers and share or retrieve information simultaneously. The available bandwidth can quickly be consumed and people may become frustrated because their devices, and applications stored on their devices, no longer work as expected.

While a radio access provider may be able to implement changes at a cellular network tower level, these changes do not take into consideration the perspective of the device or the quality of service of specific applications on the device that may be attempting to send or retrieve information.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, a system and method for measuring the quality of service at the application level on a mobile electronic computing device, e.g., in massive user presence environments. What is considered "massive" may vary among different implementations.

According to some embodiments, a test system is constructed and installed at a predetermined location. In some instances, the location is known to be the epicenter of massive gatherings. For example, stadiums, theme parks, shopping malls, concert venues, and the like are often places where large crowds of people gather. In some cases, such as at stadiums, up to about 70,000 people may gather at one time in a relatively small area.

When a sufficient number of people try to simultaneously access a wireless network, such as a cellular network, the network bandwidth can become congested and the quality of service for the individual user's network access can quickly deteriorate. This results in a poor user experience as the network is not able to respond to data upload or download requests from electronic devices on the network. As the number of users increases, the quality of service continues to degrade, oftentimes to the point where one or more applications on an electronic device do not function at all.

While the systems and methods described herein may be applicable to all types of wireless networks, this detailed description will focus on a radio access provider, such as a cellular service provider.

Figure 1:
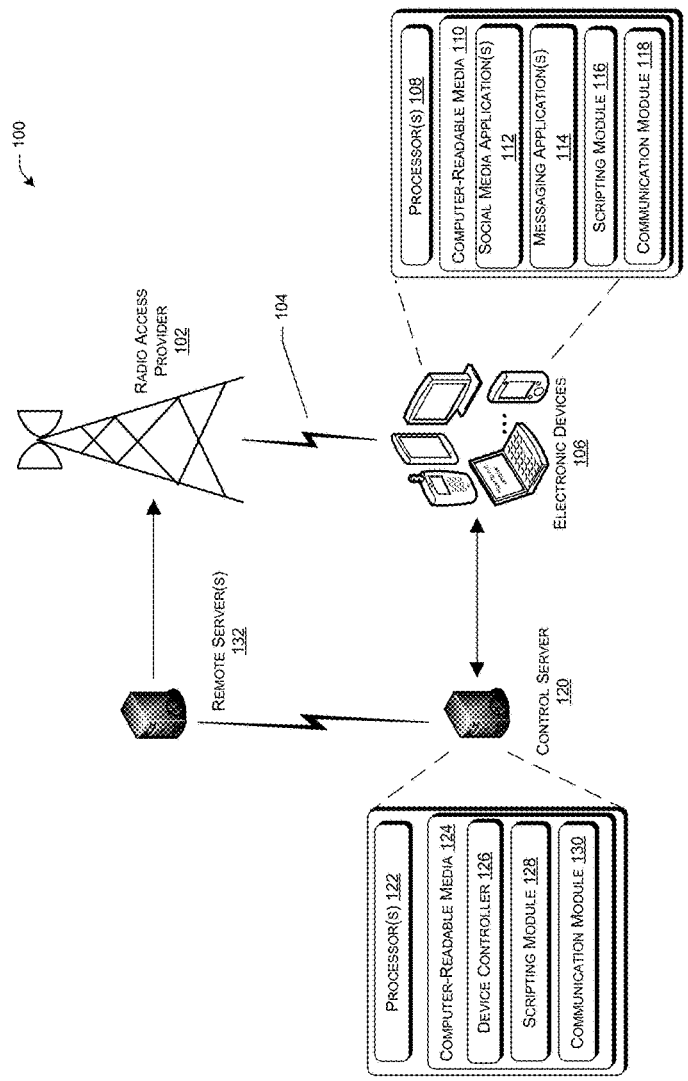
FIG. 1 illustrates an overview of one embodiment of a system for testing and improving the quality of service on a mobile electronic device at the application level.

As illustrated in FIG. 1, a radio access provider 102 may comprise any one or more base stations, node Bs, eNode Bs, or wireless access points (e.g., Wi-Fi access points, WiMax access points, etc.). The radio access provider 102 may include components fixing the radio access provider 102 to a location and positioning the radio access provider 102 at that location, such as components of a cellular tower. The radio access provider 102 may also support one or more cells of varying sizes, such as macrocells, microcells, picocells, femtocells, or other small cells, of one or more access networks of a telecommunication network 104. To provide wireless connectivity to the telecommunication network 104, the radio access provider 102 may be equipped with any number of components, such as radio antennas, transmitter components, receiver components, power amplifiers, combiners, duplexers, encoder components, decoder components, band pass filters, power sources, or control components.

In some implementations, the radio access provider 102 may transmit and receive over multiple frequency bands. Examples of such frequency bands may include a licensed frequency band, an unlicensed frequency band, a semi-licensed frequency band, an overlapped frequency band, a cellular frequency band, an AWS frequency band, a 700 MHz frequency band (e.g., band 12), an 800 MHz frequency band, a 900 MHz frequency band, a PCS frequency band, an 1800 MHz frequency band, a 1900 MHz frequency band, a 4.9 GHz frequency band, a GSM frequency band, a 2.4 GHz frequency band, a 5.0 GHz frequency band, a 5.8 GHz frequency band, a 3.65 GHz frequency band, a UWB frequency band, a frequency band in a range from 3.1-10.6 GHz, a 3G frequency band, a WCS frequency band, a MMDS frequency band, or a WiMax frequency band In some implementations, the telecommunication network 104 which includes the radio access provider 102 may include multiple other radio access providers associated with multiple other access networks (visited networks 108), ensuring continued coverage as the electronic device 106 moves from location to location. The telecommunication network 104 may implement a core network, for example, a System Architecture Evolution (SAE) core network, a General Packet Radio Service (GPRS) core network, or any other sort of core network. The core network may include a gateway GPRS support node (GGSN), a serving GPRS support node (SGSN), a mobile switching center (MSC), a home location register (HLR), a visitor location register (VLR), a mobility management entity (MME), a serving gateway (SGW), a packet data network gateway—also referred to as a packet gateway (PGW), a home subscriber server (HSS), or an evolved packet data gateway (ePDG). The access network(s) and core network 104 of the telecommunication network may associated with any one or more access technologies, such as 2G, 3G, 4G, 5G, GSM, CDMA, UMTS, HSPA, HSPA+, LTE, LTE-Advanced, Wi-Fi, or WiMax.

In various implementations, one or more electronic devices 106 may connect to the telecommunications network 104 and may be any sort of computing device that is capable of communicating over one or more frequency bands. Examples of electronic devices 106 include a personal computer, a laptop computer, a server, a server farm(s), a mainframe, a tablet computer, a work station, a telecommunication device, a smartphone, a cell phone, a personal digital assistant (PDA), a media player, a media center device, a wearable device, a personal video recorder (PVR), a television, an electronic book reader, a set-top box, a camera, a video game console, a kiosk, a gaming device, processor(s), integrated components for inclusion in a computing device, an appliance, an electronic device for inclusion in vehicles, a gaming device, or any other sort of device.

The electronic devices 106 may include one or more processors 108 and computer-readable media 110. The computer-readable media 110 is non-transitory and may store various instructions, routines, operations, and modules that, when executed, cause the processors to perform various activities. In some implementations, the one or more processors 108 are central processor units (CPU), graphics processing units (GPU) or both CPU and GPU, or any other sort of processing unit. The non-transitory computer-readable storage media 110 may include volatile and nonvolatile, removable and non-removable tangible, physical media implemented in technology for storage of information, such as computer readable instructions, data structures, program modules, or other data. System memory, removable storage, and non-removable storage are all examples of non-transitory computer-readable media. Non-transitory computer-readable storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the electronic devices 106.

As illustrated in FIG. 1, the computer-readable media 110 of the electronic devices 106 maintains various applications and modules, such as social media applications 112, messaging applications 114, a scripting module 116, and a communication module 118. Of course, other modules may be included and may be configured with instructions to carry out various other tasks not further described herein.

The social media applications 112 may include one or more of any social media application that may be run on an electronic device. Most social media applications allow users to stay in touch through sharing their thoughts, experiences, images, and video clips with other users.

Messaging applications 114 allow users to send and receive information, such as through e-mail, short message service ("SMS)" texting, and multimedia messaging service ("MMS"). The messaging applications 114 allow users to send text and images to one another over a telecommunications network 104 and are oftentimes much more efficient than sending the same information through e-mail services.

A scripting module 116 may store one or more scripts that provide instructions to the electronic device 106 for executing and manipulating the social media applications 112 and/or the messaging applications 114. In some instances, the scripting module 116 receives one or more scripts from another source, while in other instances, the scripting module stores one or more scripts for execution on the electronic device 106.

The scripts may be any suitable instructions for operating the electronic device 106 and the applications stored thereon. For example, the scripts may provide instructions to the one or more processors 108 that, when executed, cause the processors to perform instructions such as launching a particular application, selecting options within the application, entering text within the application, and submitting data through the application. In short, the scripts preferably function to interact with the applications in much the same way a user would interact with the applications by launching the applications, entering information into the applications, and sending the information through the applications.

The communication module 118 preferably provides communication service to the electronic device 106 through one or more communication ports, which may include wireless radio communication and wired communication. Suitable communication ports include, for example, Bluetooth, USB, radio frequency, FireWire, HDMI, and other such ports that enable the electronic device 106 to communicate with another external device.

In some embodiments, when deploying an electronic device 106 in a test environment, a control server 120 may be connected to the electronic device 106. The control server may have one or more processors 122 and computer readable media 124. The computer readable media 124 may maintain various applications and modules, such as a device controller 126, a scripting module 128, and a communication module 130.

As used herein, the term "test environment" is a broad term and should not be construed to mean any particular environment or location, but rather, refers to any device in any environment in which the scripts and measurements described herein may be implemented. A test environment may include a location known to have mass gatherings, it may encompass a city, an outdoor location, and may additionally include a large area within which the system described herein is able to determine coverage and quality of service ("QoS") maps for subscribers.

The device controller 126 includes instructions that are able to be sent from the control server 120 to the electronic device 106 in order to control the electronic device 106. For example, the device controller 126 may issue commands to the electronic device 106, such as, for example, to power on, to run one or more scripts, or to send data.

The control server 120 may further have a scripting module 128 which can store, send, generate, or retrieve scripts for execution by the electronic devices 106. In some instances, the scripting module 128 will have scripts stored therein that cause the electronic devices 106 to execute a series of commands. The scripting module 128 of the control server 120 may cooperate with the scripting module 116 of the electronic device 106 to cause the electronic device 106 to run the provided scripts. Of course, in some embodiments, a scripting module may be provided on either the electronic devices 106 or the control server 120, or both.

The scripting module 128 on the control server 120 may store one or more preprogrammed scripts and can instruct the electronic devices 106, through the device controller 126, to execute the one or more scripts on a schedule, or continuously throughout the testing period.

The communication module 130 allows communication from the control server 120 to the electronic devices 106, and also to a remote server 132. The communication module 130 may take advantage of any communication protocol and any suitable hardware to provide for communication. In some embodiments, the communication module 130 is configured to communicate with the electronic devices 106 through a cable, which may provide for the most efficient data transfer between the electronic devices 106 and the control server 120.

The communication module 130 further allows the control server 120 to receive additional instructions from a remote location, such as the remote server 132, to receive scripts for the electronic devices 106 to execute, testing schedules, and other information that implements the system described herein.

The communication between the electronic devices 106 and the control server 120 may be bidirectional such that the control server 120 sends instructions to the electronic devices 106, and the electronic devices 106 send data indicating the results of executing the scripts to the control server 120. It is preferable that the electronic devices 106 are functioning in a real-world scenario and model the functionality as if they were being controlled by a user. As such, it may be desirable to limit the communication between the electronic devices 106 and the control server 120 during the testing period. That is, the communication between the control server 120 and the electronic devices 106 may be scheduled during periods when testing is not active, thereby avoiding the use of processor 106 cycles for communication associated with testing and freeing up the one or more processors 106 and memory of the electronic devices 106 to behave independently of the testing environment.

In use, the control server 120 may send one or more scripts to the electronic devices 106 that include instructions such as to launch a particular application and send and/or receive data through the application over the telecommunication network 104 provided by the radio access provider 102.

The electronic devices 106, through the scripting module 116, may execute the one or more scripts at a predetermined time and track the results of the actions programmed in the scripts. For example, a script may cause the electronic device 106 to launch a messaging application 114, compose a message, and send the message. The electronic device 106 may track how long it takes the messaging application 114 to report that the message was successfully sent. The electronic device 106 may employ a counter, a clock, a stopwatch, a timestamp, or some similar functionality in order to determine the length of time between instructing the application to send the message and when the application reports that the message was sent. This time may be characterized as the perceived response rate, or in other words, a front end response rate. That is, a user sending the message will perceive that the message has been successfully sent, even if the message has not reached its intended destination yet. The time the message takes to actually reach the intended destination may be characterized as the actual response rate, or the back end response rate. After the testing is completed, or in some cases, while testing is still underway, the electronic device 106, through the communication module 118, may report to the control server 120 the front end response rate of the application.

The scripts may continue to cause the electronic device 106 to send and receive data while measuring the front end response rate, which may be indicative of a user experience. The user experience may be significantly degraded where there is a lot of traffic across the telecommunication network 104 and the front end response rate may be degraded, thus resulting in a very poor user experience. In some instances, the front end response rate is more important than the actual response rate, because the front end response rate is the only rate that the user is typically aware of. For example, where a user posts a photograph to a social networking site, a front end response rate of one second provides a good user experience, even if the actual response rate is ten minutes. However, if the front end response rate closely coincides with the actual response rate, such as where an application waits for the actual response rate before displaying a successful data transmission indication to the user, in this case ten minutes, the result is a severely degraded user experience.

The electronic devices 106 ultimately send the response rate data to the control server 120 for aggregation. The control server 120 collects and stores the response rate data for further processing and analysis. By storing the data on the control server 120, the computer-readable media 110 of the electronic devices 106 is freed up to carry out the activities programmed into the scripts.

The radio access provider 102 may include one or more remote servers 132, such as a server or server farm, multiple, distributed server farms, a mainframe, a work station, a personal computer (PC), a laptop computer, a tablet computer, an embedded system, or any other sort of device or devices.

The remote servers 132 are in communication with the control server 120 and may be in further communication with radio access equipment provided by the radio access provider 102, such as a cellular tower. The remote servers 132 receive data from the control server 120, and may further receive data from the electronic devices 106. For example, the front end response rate data aggregated on the control server 120 may be periodically (or continually) sent to the remote servers 132, which may process this data to determine a perceived user experience based upon the front end response rates of various applications being executed on the electronic devices 106 within the test environment.

The remote servers 132 may additionally determine the back end, or actual, response rate based upon data sent from the electronic devices 106 over the telecommunication network 104 to the remote server 132. The electronic devices 106 may maintain a timestamp or other indicator of the data sent over the telecommunication network 104 in response to a command within the script running on the electronic device 106. The remote servers 132 may receive the data sent by the electronic devices 106 over the telecommunication network 104 and match up the received data with the timestamp to determine the actual response rate, that is, the time it took from when the data send was initiated on the electronic device 106 until the data reached the remote server 132.

The remote servers 132 thus are able to compare the front end response rate with the back end response rate and determine, not only the actual quality of service for an application running on the electronic device 106, but also the perceived quality of service for the application within the environment.

In some embodiments, the remote servers 132 are able to make changes to the telecommunication network 104, such as by reconfiguring the equipment of the radio access provider 102 to allocate additional bandwidth and provide increased service to the test environment. In some instances, the remote servers 132 are able to reallocate bandwidth from one location to another location, which may be done in direct response to the quality of service within the test environment, or may be done proactively when the system determines that usage of the telecommunication network 104 is likely to be high.

In other cases, the telecommunication network 104 may be modified such as by providing increased QoS for outbound traffic. Similarly, the QoS may be modified on the fly during an event that is likely to create a sudden increase in traffic. For example, based upon historical information collected from a test environment, it may be known how the traffic spikes following a touchdown at a football game. Accordingly, at a future football game, when a touchdown is scored, the remote servers 132 can modify the telecommunication network 104 that services the geographic area in which the football stadium is located to better account for the anticipated sudden spike in traffic.

Furthermore, the telecommunication network 104 may be modified by adjusting allocated bandwidth within certain frequency spectrums to account for the devices that are likely to be present within the environment. For example, in an environment in which it is anticipated that predominantly older mobile device will be used for voice communication, the frequencies allocated to voice communication can be increased to provide a desired QoS to those devices. Similarly, where it is anticipated that a majority of devices located within an environment will rely on data transmission, the bandwidth of frequencies allocated for data transmission can be increased to provide a desired QoS for data transmission within the environment during the relevant time period.

Figure 2:
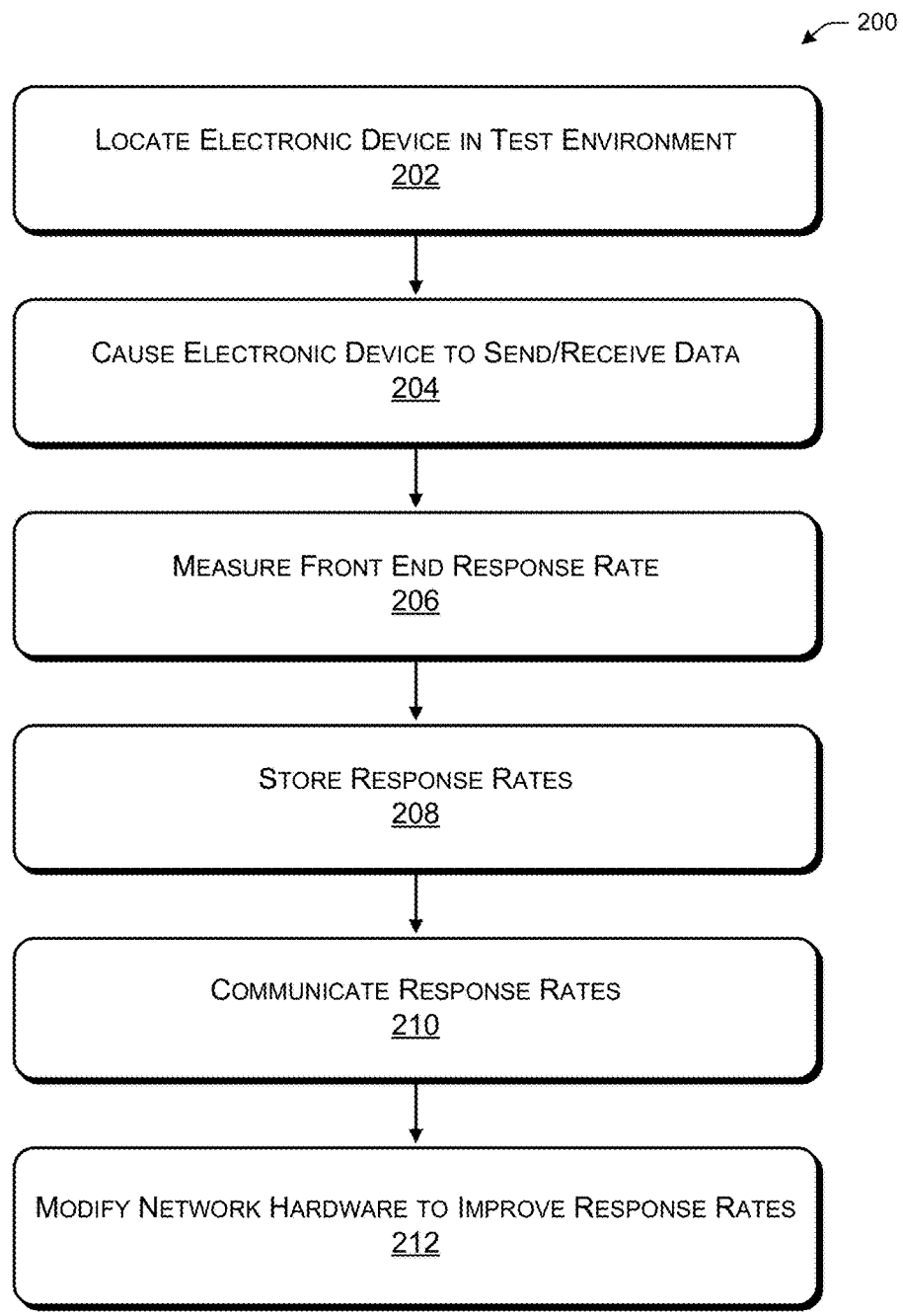
FIG. 2 illustrates an example process for measuring application degradation and improving performance.

FIG. 2 illustrates an example process 200 for carrying out the testing and control system as illustrated in FIG. 1. At block 202, a mobile electronic device 106 is located within a test environment. A test environment may be anywhere that people use electronic devices 106. However, in some embodiments, a test environment may be selected in order to analyze the effects of a massive user presence, and the test environment may be a sporting stadium or concert venue where, at certain events, tens of thousands of users may be congregated. The electronic device 106 may be permanently, or semi-permanently, installed within a test environment, or may be placed there on a temporary basis.

As described above, the control server 120 provides a script of instructions to the electronic device 106 for execution during the test. The script may invoke one or more applications stored on the electronic device 106 and instruct the application to send data from the electronic device 106. Suitable data may include text, images, icons, video clips, and other suitable forms of data that a user might ordinarily send from an electronic device 106.

In some embodiments, a control server 120 is co-located with the electronic device 106, and at block 204, the control server 120 causes the electronic device to send/receive data. This may be done through any suitable application executable on the electronic device, such as a social media application, 112, messaging application 114, or some other application that can send data. The control server 120 may send one or more scripts to the electronic device 106 and instruct the electronic device 106 to execute the script.

At block 206, the front end response rate is measured. For example, once the electronic device 106 issues the command to send the data over the telecommunication network 104, a timer starts on the electronic device 106 to measure the time it takes until the application indicates that the data was successfully sent. At block 208, the front end response rate may be stored locally on the electronic device 106 until the testing script is completed or until some other future time at which the electronic device 106 has completed the testing routines. The response rates may be stored in a relational database, or some other suitable format. In some embodiments, the relational database will include fields to store data relevant to the test results. For example, data associated with a test ID, a time stamp, the application being tested, a device ID or other identifier of the electronic device 106, and the front end response rate. At block 210, the front end response rates (and other relevant test data) may be communicated to the control server 120 for storage, and may ultimately be sent to the remote server 132 for processing or archival purposes.

Analysis of the front end response rates may indicate issues with the telecommunication network 104, with one or more applications stored and executed on the electronic devices 106, or with the electronic device 106 itself. However, in many cases, a degraded front end response rate will indicate significant congestion with the telecommunication network 104. At block 212, the network hardware and software, such as the allocated bandwidth through a cellular tower, or a configuration of the cellular tower, may be modified to improve the quality of service at the test environment. The process 300 may be performed in real time. For example, where an event is taking place at the test environment, the system 100 may determine an actual quality of service of either an application or the telecommunication network, and initiate changes immediately to address the current bandwidth demand at the massive user presence environment.

Figure 3:
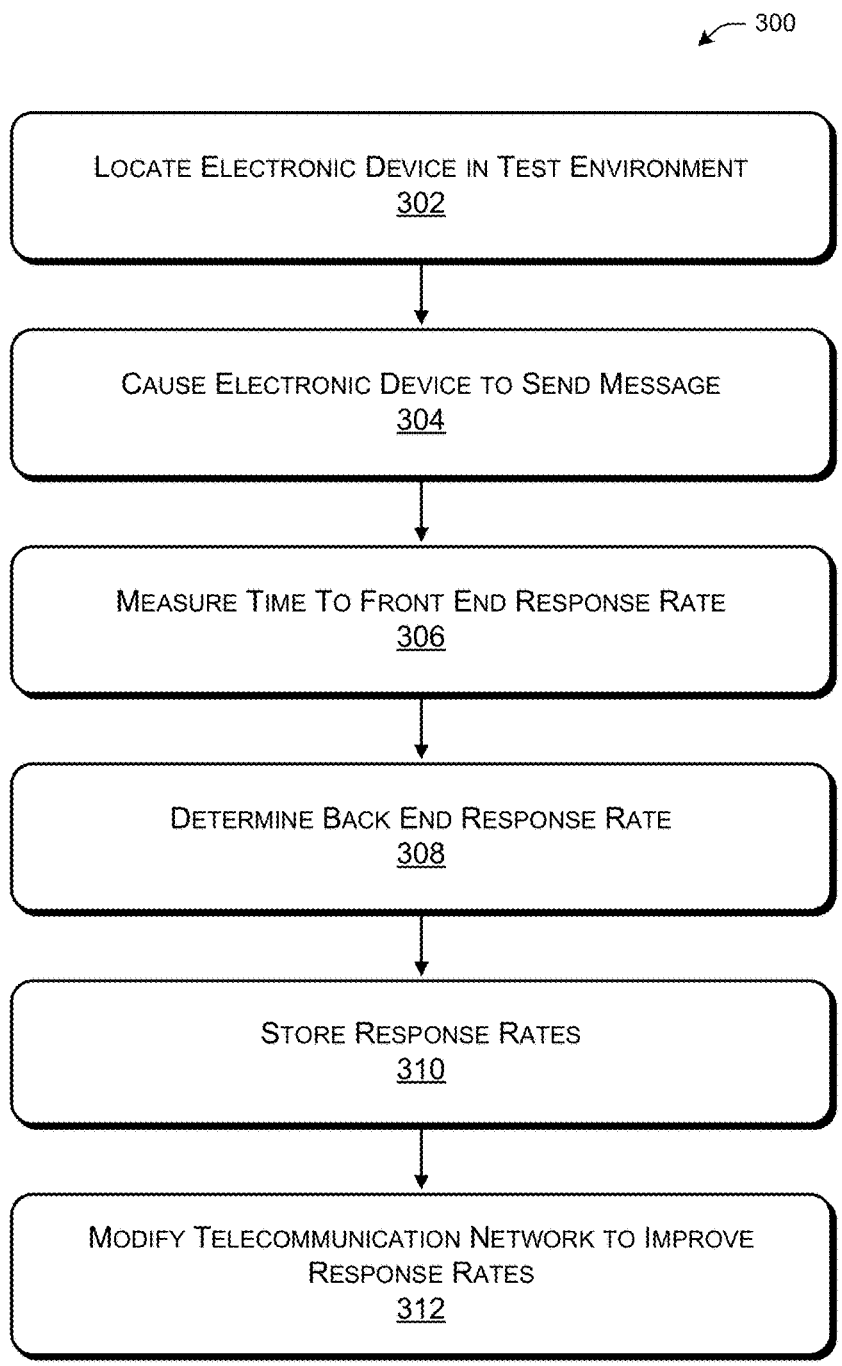
FIG. 3 illustrates an example process for measuring user experience and quality of service and improving performance.

FIG. 3 illustrates a process 300 for comparing front end response rates and back end response rates when sending a message and improving the response rates. At block 302, an electronic device 106 is located within a test environment. In some cases, a control server 120 is co-located with the electronic device. Optionally, the electronic device may operate on battery power, or may be connected to a constant power source.

At block 304, the electronic device 106 is caused to send a message. More specifically, the electronic device is caused to execute a script that launches a messaging application 114. In some instances, the messaging application 114 may send and receive SMS messages and/or MIMS messages. The script further causes a message to be entered into the messaging application 114. The message may be text, images, video, or the like. The electronic device 106 is caused to send the message over the telecommunication network 104, and upon issuing the command to send the message, starts a timer. At block 306, the timer is stopped when the messaging application 114 indicates that the message has been sent, thus measuring the front end response rate. This also correlates to the perceived quality of service that the user experiences since to a user, the task is completed once the application indicates that the message has been sent.

At block 308, the back end response rate is determined. In some embodiments, the messaging application 114 is instructed to send a message that will be received by the remote servers 132. The remote servers 132 may track when the message arrives at its destination (the "message receipt time"). The message receipt time may be compared against a time stamp indicating when the message was sent (the "message sent time"). The time stamp may be stored by the electronic device 106, such as in a database, and provided to the control server 120, and ultimately, to the remote server 132. The remote server 132 may then compare the message sent time against the message receipt time to determine the back end response rate.

At block 310, the front end response rate and the back end response rate are stored on the remote server 132 for analysis. Where the back end response rate is relatively slow, this may indicate that there is significant congestion with the telecommunication network 104. At block 312, the telecommunication network may be modified to account for the congestion to improve the front end response rate, the back end response rate, or both.

A relatively slow front end response rate may indicate that the application is inefficient. The front end response rates may be analyzed to determine how an application functions within a massive user presence environment. In some cases, an application may be programmed to delay providing a notification to the user that a message has been successfully sent until the message has been actually sent and a confirmation of receipt has been received before notifying the user. For example, in a massive user presence environment, the front end response may be frustratingly slow for a user and may ultimately result in a poor user experience.

The telecommunication network 104 may be modified to improve the front end response rate and the backend response rate at the environment. The telecommunication network 104 may be modified temporarily, such as when it is determined that an event is scheduled to occur at the environment that is likely to draw a large crowd. Where the test indicates that there is current congestion of the telecommunication network 104, the telecommunication network 104 may be modified immediately to account for the massive user presence. The telecommunication network 104 may be modified during this time to provide a positive user experience.

Moreover, the front end and back end response rates may be tracked over time at an environment that hosts various crowd drawing events. The historical response rates at various events may be used to predict the likely effect on user experience at future events and the telecommunication network 104 may be proactively modified to provide more robust service to the environment during the event.

Figure 4:
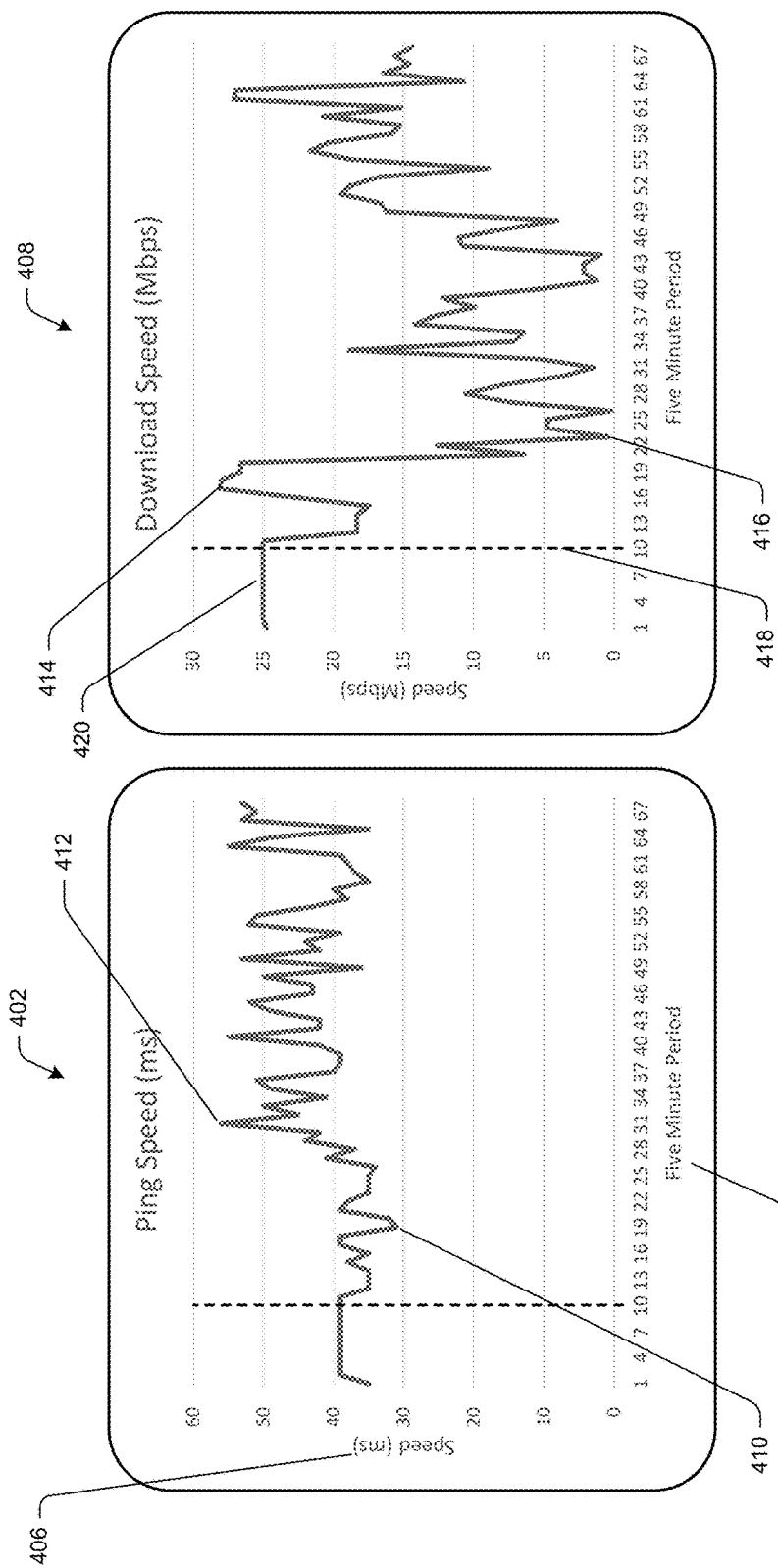
FIG. 4 illustrates an example of measured data rates in a massive user presence environment.

FIG. 4 illustrates an example of measured data rates in a massive user presence environment. The test data is representative of an electronic device 106 positioned within a stadium during an event. A ping speed graph 402 illustrates how the ping speed of the electronic device 106 was affected by congestion to the telecommunication network 104 during an event at the stadium. As can be seen, the graph is divided into fine-minute increments along the horizontal axis 404, and the vertical axis represents the ping speed 406 (in milliseconds "ms") of the electronic device 106 as it connected to a website over the telecommunication network 104.

Similarly, the download speed graph 408 is divided into the same five-minute increments along the horizontal axis and a speed (in megabits per second "Mbps") along the vertical axis. According to the ping speed graph 402, the ping speed of the electronic device 106 varied greatly, from a low 410 of about 30 ms 410 to a high 412 of about 55 ms. The ping speed graph 402 indicates that, where there was a significant amount of traffic accessing the telecommunication network 104, the ping speed of the electronic device increased by about 80%.

What may be more concerning; however, are the results of the download speed graph 408. The download speed of the electronic device 106 during the test indicates a high 414 of about 27 Mbps and a low 416 of nearly 0 Mbps. Thus, during the test, the available bandwidth was taxed to such an extreme that the download speed experienced by an individual electronic device 106 was reduced to essentially 0 Mbps. The result was a very poor user experience. The event began at about the tenth time period 418, and prior to the start of the event, the download speed was relatively constant at 25 Mbps 420. However, shortly after the beginning of the event, there was a sudden decrease in the download speed. The sudden decrease in download speed may have been caused, for example, following an exciting event happening within the environment that caused many users associated with electronic devices 106 to send data over the telecommunication network 104.

Where the event occurring at the environment was, for example, a football game, the results depicted in the graph may be used to predict future usage of the telecommunication network 104 during a future football game at the stadium. The telecommunication network 104 can then be temporarily modified to account for the increased usage during a subsequent football game.

Figure 5:
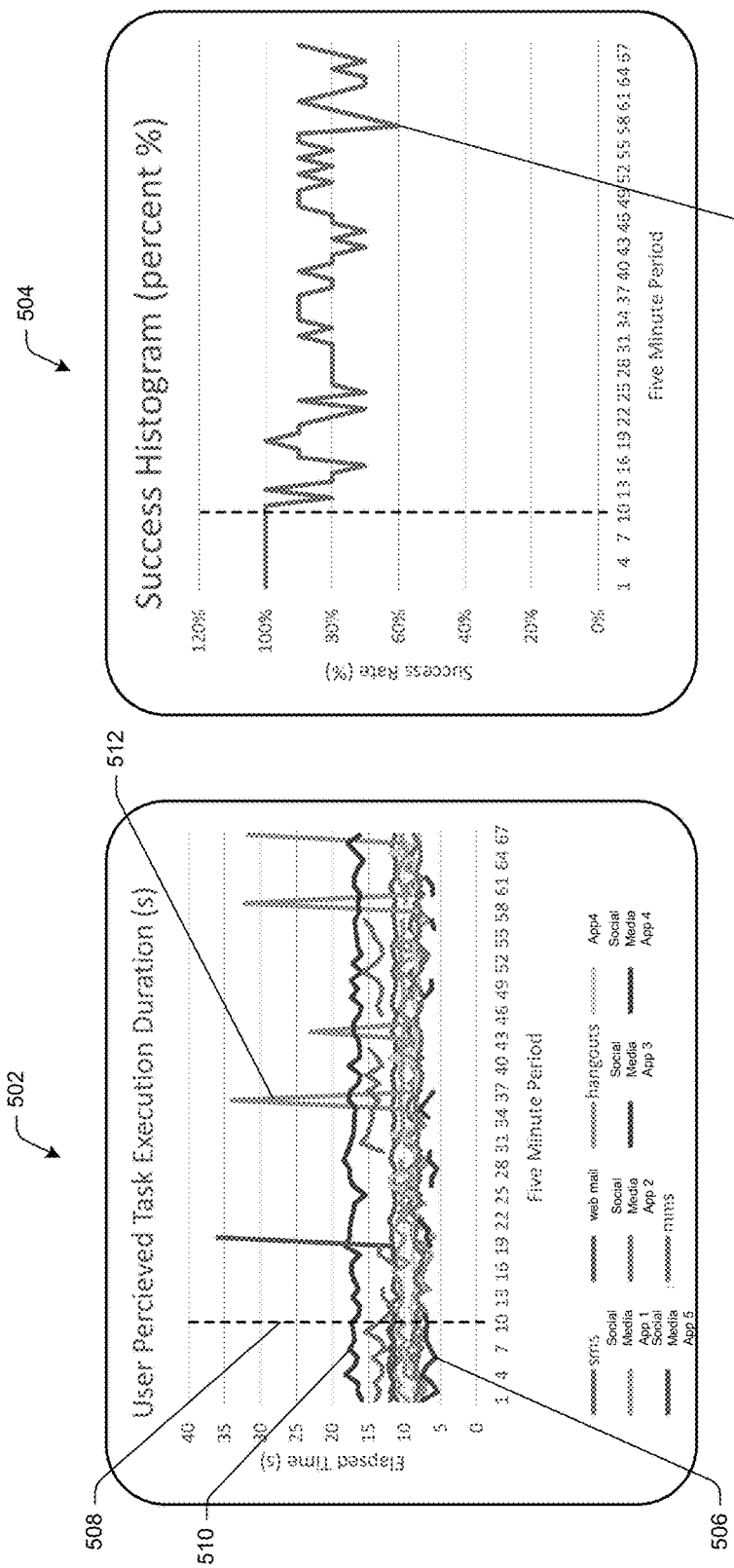
FIG. 5 illustrates an example of measured task execution in a massive user presence environment.

FIG. 5 illustrates a user perceived task execution duration graph 502 and a success histogram 504. In compiling the user perceived task execution duration graph 502, various applications were executed on the computing device 106 including various social media applications 112 and messaging applications 114 according to a script. The graph illustrates a sample user experience within a massive user presence environment, such as in a stadium during a football game.

The user perceived task execution duration graph 502 indicates the time it took for an application to report that the task had been successfully completed. The horizontal axis of the graph 502 represents five-minute increments and the vertical axis of the graph 502 represents the elapsed time from the command to send data until the application reported that the task was complete, also referred to as the front end response rate. As can be seen, the results vary dramatically across the various applications. For example, toward the bottom of the graph, the data associated with Social Media App 3 506 indicate that while the front end response rate of Social Media App 3 506 was relatively quick, the graph is discontinuous, which indicates that there were several instances where Social Media App 3 never reported that the task was completed. In fact, during the first ten five-minute increments before the event began, and Social Media App 3 performed efficiently; however, once the event began at the tenth five-minute increment 508, Social Media App 3 was largely unusable during the event.

Conversely, the data corresponding to Social Media App 4 510 indicates that while the front end response rate of Social Media App 4 510 was, on average, the longest time period averaging nearly 18 seconds, the continuity of the graph indicates that Social Media App 4 reported a successful message 100% of the time. The continuity and relatively flat line of the front end response rate of Social Media App 4 510 further indicates that the front end response rate of Social Media App 4 510 is less affected by congestion on the telecommunication network 104 than some of the other applications. For example, the front end response rate of a hangouts application 512 indicates several spikes in the front end response rate along with discontinuity in the graphed data. This indicates that the front end response rate of the hangouts application 512 is greatly affected by the environment and the demand on the telecommunication network 104. For example, at its low, the front end response rate of the hangouts app 512, was approximately five seconds. However, the spikes in the data indicate that at some points, the front end response rate of the hangouts app 512 was over thirty seconds, and in many cases, the front end response rate was infinity, meaning that the hangouts app 512 failed to report a successful data send. Thus, the graph 502 clearly shows that different applications behave very differently in the massive user presence environment. Therefore, not only can there be improvements made to the telecommunication network 104 to account for a massive user presence environment, but improvements may be made to the functioning of the applications themselves to provide an improved front end response rate and an improved user experience.

As would be expected from the analysis of the user perceived task execution duration graph 502, the data represented by the success histogram 504 indicates a data transmission success rate of less than 100%. In other words, there was a lot of data that was never sent over the telecommunication network 104 following a command to send the data. In fact, at one point, around the fifty-eighth time period 514, the success rate of data transmission dropped to about 60%, indicating that 40% of the data that was sent by the electronic devices 106 within the environment never reached the intended destination.

Figure 6:
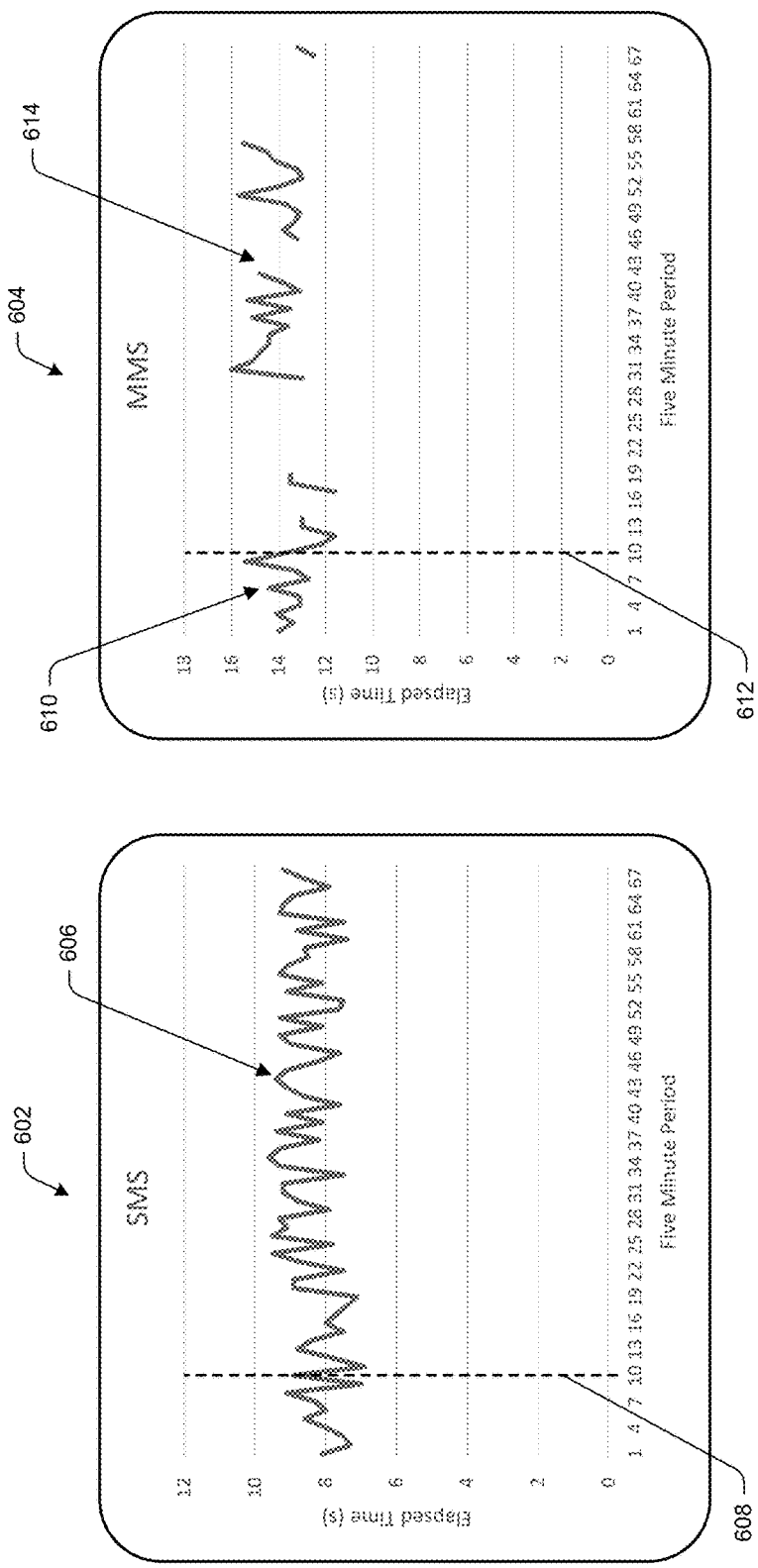
FIG. 6 illustrates an example graph of messaging test results in a massive user presence environment.

FIG. 6 illustrates a graph of the front end response rate of an SMS messaging app 602 and a graph of the front end response rate of an MMS messaging app 604. These graphs are both represented by five-minute increments along the horizontal axis and elapsed time on the vertical axis. The elapsed time indicates the front end response rate of each app, respectively.

As can be seen, the front end response rate of the SMS messaging app 606 had relatively little variability, such as about 2.5 seconds from the high point to the low point, or a variability of about 30%. However, of importance is the fact that the event only began at approximately time increment number 10 608, and the front end response rate of the SMS messaging app 606 remained largely unchanged from the pre-event time period and throughout the event.

The graph of the front end response rate of the MMS messaging app 604 tells a different story. Before the event began, illustrated in the graph as prior to the 10$^{th}$ five-minute period, the front end response rate of the MIMS messaging app 610 indicates that the MIMS messaging app was fairly stable. However, once the event got underway at the tenth five-minute increment 612, the front end response rate of the MMS messaging app 614 indicates that the data transmission was sporadic and through much of the event, was unusable. From the perspective of the electronic device 106, it may appear that the MMS messaging app was frozen, or stuck in a cycle of unsuccessfully trying to send data. In fact, as illustrated in the graph 604, between about the 19$^{th}$ five-minute period and the 31$^{st}$ five-minute period, an actual time period of about sixty minutes, the MMS messaging app never reported a successful data transmission. Of course, this could be frustrating to a user attempting to send data through the MMS messaging app during the event.

Figure 7:
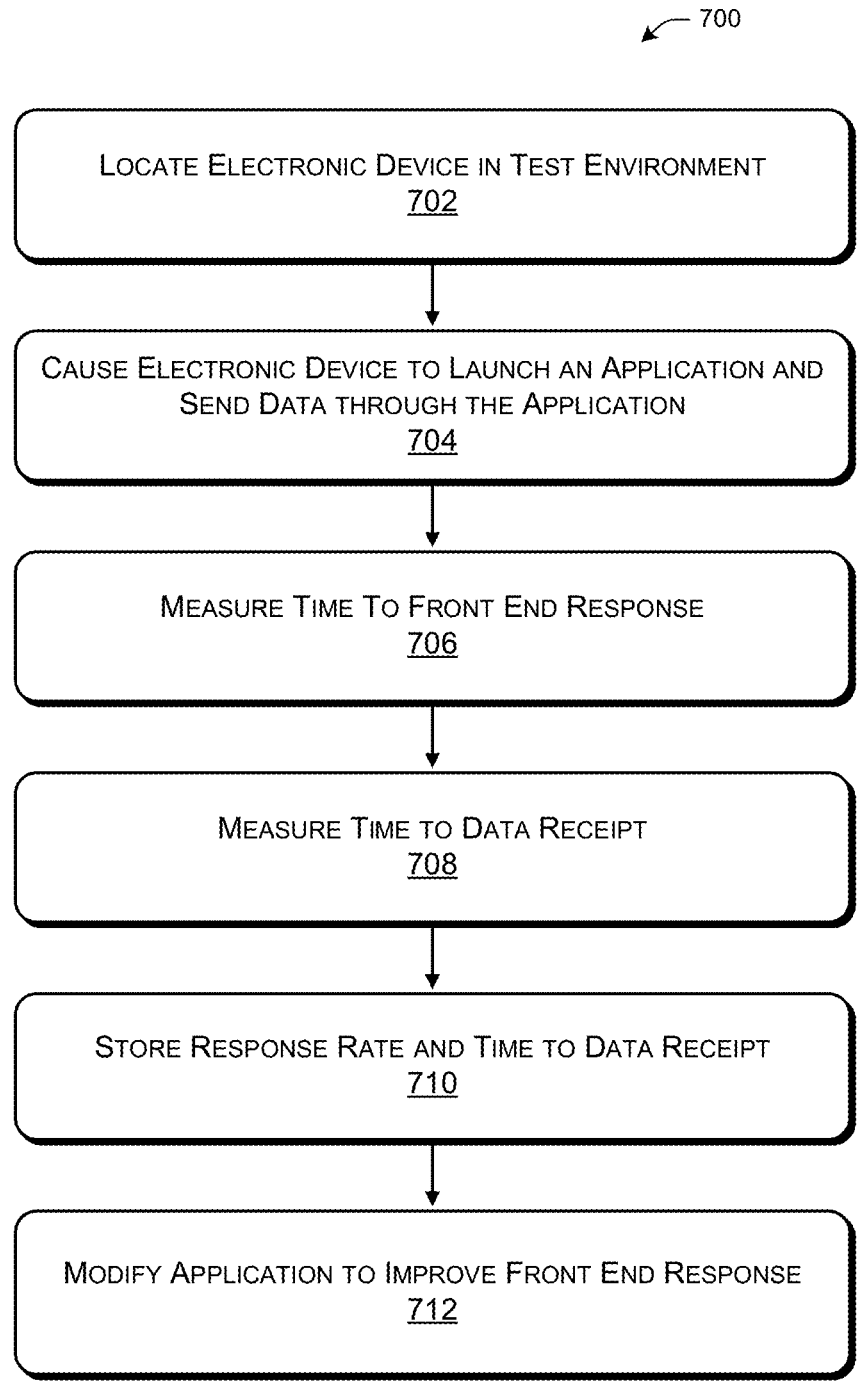
FIG. 7. Illustrates an example process for testing and improving application front end response rates.

FIG. 7 illustrates an example process 700 for measuring the front end response rate of an application and modifying the application to improve the front end response rate. At block 702, an electronic device 106 is located within a test environment. At block 704, the electronic device 106 is caused to launch an application and send data through the application. As described herein, this may be performed, for example, by providing a script to the electronic device 106 and causing the electronic device 106 to execute the script. The script may contain instructions that cause the electronic device 106 to launch one or more applications stored on the electronic device 106 and send data through the one or more applications. At block 706, the front end response rate is measured, such as through commands in the script that cause the electronic device 106 to initiate a timer when the command is given to send the data through the application, and stop the timer when the application reports that the data has been sent. The front end response rate may be stored locally on the electronic device 106, such as in a database, or may be sent to the control server 120.

At block 708, the time to data receipt is measured, which also may be referred to as the back end response rate. One method of measuring the back end response rate is to include a time stamp with the front end response rate that indicates when the command to send the data was given, and the time stamp can be matched up against another time stamp that indicates when the data was received. Of course, where only the front end response rate of an application is important, the process of block 708 may be omitted since the back end response rate is independent of the front end response rate.

At block 710, the front end response rate is stored, and optionally, the time to data receipt is stored. This data may be stored, for example, on the remote server 132, on the control server 120, on the electronic device 106, or a combination. For example, the front end response rate may initially be stored on the electronic device 106, then sent to the control server 120, and eventually be sent to the remote server 132. The time to data receipt may initially be stored on the remote server 132 and can be used in conjunction with the front end response rate to determine the back end response rate.

At block 712, an application is modified to improve the front end response rate. There are numerous ways of improving the front end response rate of an application. For example, a timeout setting can be configured within the application that resets the application if data is not successfully sent within a predetermined amount of time. Additionally, an application can display a success message after a predetermined amount of time, or simply display a screen of the application other than a data waiting to send screen that appears to the user as if the data was successfully sent. Other modifications, such as reducing the quality of the message, or automatically retrying to send the data a predetermined number of times after a predetermined period of time, can be performed if the conditions of the telecommunication network 104 are inhibiting the data from sending. Additionally, an application could be configured to defer or limit nonessential data transmissions until conditions with the telecommunication network 104 improve.

Through the systems and methods described herein, a technical improvement is made to an electronic device 106, such as a mobile communication device. For example, a system and method for testing can measure, and even predict, the usage needs of a crowd within a massive user presence environment. The system can further allocate bandwidth at a desired location, at a desired time, and in a desired amount to account for the increased demand on a telecommunication network 1004 which improves the functioning of the network and the functioning of the electronic devices located within the environment. Moreover, through the systems and methods described, improvements to applications executing on mobile devices can be improved to result in an improved user experience to account for a bandwidth demand in a massive user presence environment.

In another instance, the massive user presence environment may be expanded to a city, a county, a state, or some other geographic boundary for example. Electronic devices 106 located within a city may run one or more scripts to measure the demands on a telecommunication network 104 providing service to users within the city. A script may be stored on multiple electronic devices 106 belonging to users in a geographic area, and the multiple electronic devices can track the front end response rates of various applications. The data associated with the front end response rates may be stored locally and eventually forwarded to a remote server 132. This type of crowd-sourcing of front end response rates may provide a very unique data map that indicates not only application-level front end response rates and quality of service at various geographic regions, but also provides a geographic network traffic map, the front end response rates of various types of hardware connected to the telecommunication network 104, and actual quality of service for various users connected to the telecommunication network 104. In some instances, implementing crowd-sourced data gathering may be accomplished by offering subscribers to the telecommunication network 104 an incentive to allow their devices to take part in the data generation.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
 an electronic device having one or more processors and computer-readable media storing scripted instructions, that when executed by the one or more processors, cause the electronic device to perform acts comprising:
  launching a messaging application;
  entering a text message into the messaging application;
  issuing a command to the messaging application to send the text message over a telecommunication network, the telecommunication network operating at a first bandwidth allocation;
  determining, by measuring an amount of time between issuing the command and receiving an indication from the messaging application that the text message was successfully sent, a front end response rate;
 a server having one or more processors and computer-readable media storing instructions that, when executed by the one or more processors, cause the server to perform acts comprising:
  receive the text message;
  record a time at which the text message is received;
  receive, from the electronic device, the front end response rate;
  determine, based at least in part on the time at which the text message is received and the front end response rate, a back end response time of the telecommunication network; and
  provide, based at least in part on the front end response rate, a second bandwidth allocation to the telecommunication network, the second bandwidth allocation being greater than the first bandwidth allocation.

2. The system as in claim 1, wherein the electronic device is located in a massive user presence environment.

3. The system as in claim 1, further comprising a control server in communication with the electronic device, the control server comprising instructions that cause the electronic device to execute the scripted instructions.

4. The system as in claim 1, wherein the text message includes a time stamp indicating a send time at which the command to send the text message was issued.

5. A method, comprising:
 locating an electronic device in a test environment;
 executing a scripted series of commands on the electronic device, the commands causing the electronic device to:
  launch an application;
  instruct the application to send data over a telecommunication network, the telecommunication network operating at a first bandwidth allocation;
  record a first time at which the application is instructed to send the data;
  record a second time at which the application indicates that the data was sent; and
  determine, based upon the first time and the second time, a front end response rate of the application;
 record a third time at which the data is received;
 determine, based at least on the front end response rate and the third time, a back end response time of the telecommunication network; and
 provide, based at least in part on the front end response rate, a second bandwidth allocation to the telecommunication network, the second bandwidth allocation being greater than the first bandwidth allocation.

6. The method as in claim 5, further comprising executing, on the electronic device, a second application and determining a second front end response rate of the second application.

7. The method as in claim 5, further comprising providing a third bandwidth allocation to the telecommunication network based at least in part on the back end response rate, the third bandwidth allocation being greater than the first bandwidth allocation.

8. The method as in claim 5, further comprising sending the front end response rate to a server for storage and analysis.

9. The method as in claim 5, wherein executing the scripted series of commands occurs at a first time during an event taking place in the test environment and wherein providing a second bandwidth occurs at a second time when a subsequent event is taking place in the test environment.

10. The method as in claim 5, wherein locating an electronic device in a test environment includes locating the electronic device in a sports stadium.

11. The method as in claim 5, further comprising modifying the application to reduce the front end response rate of the application.

12. A method under control of one or more computing devices, the method comprising:
 locating an electronic device in a test environment;
 locating a control server in the test environment, the control server in communication with the electronic device;
 sending an instruction to launch an application stored on the electronic device;
 sending an instruction to send data through the application and over a telecommunication network;
 receiving, at the control server, a timestamp associated with the instruction to send data through the application;
 receiving, from the application, an indication that the data was sent;
 determining, by the control server and based at least in part on the indication that the data was sent and the timestamp, a front end response rate;
 modify, based at least on the front end response rate, the application.

13. The method of claim 12, further comprising receiving, from the electronic device, the data and determining, based at least in part on the timestamp and the receiving the data, a back end response rate.

14. The method of claim 13, further comprising allocating, based at least in part on the back end response rate, additional bandwidth to the telecommunication network.

15. The method of claim 14, wherein locating the electronic device in the test environment occurs during a first time at which a first event is taking place in the environment and the allocating additional bandwidth occurs at a second time at which a second event is taking place in the environment.

16. The method of claim 15, wherein locating the electronic device in a test environment includes locating the electronic device in a sports stadium.

17. The method of claim 12, further comprising pushing a test script to the electronic device, the test script including instructions that cause the electronic device to:
   launch the application;
   send data through the application; and
   determine the front end response rate.

18. The method of claim 17, wherein pushing the test script to the electronic device comprises pushing the test script to a plurality of electronic devices associated with one or more subscribers of the telecommunication network.

19. The method of claim 18, further comprising allocating, based upon the front end response rate, an additional bandwidth to telecommunication network servicing the test environment.

\* \* \* \* \*